United States Patent
Munoz et al.

(10) Patent No.: US 12,328,347 B2
(45) Date of Patent: Jun. 10, 2025

(54) SYNTHETIC MODERATOR

(71) Applicant: Mass Luminosity, Inc., Lake Texas, TX (US)

(72) Inventors: Angel Munoz, Dallas, TX (US); Teodor Atroshenko, Sao Marcos (PT)

(73) Assignee: Mass Luminosity, Inc., Dallas, TX (US)

( * ) Notice: Subject to any disclaimer, the term of this patent is extended or adjusted under 35 U.S.C. 154(b) by 0 days.

(21) Appl. No.: 17/402,228

(22) Filed: Aug. 13, 2021

(65) Prior Publication Data
US 2023/0059158 A1    Feb. 23, 2023

(51) Int. Cl.
| | | |
|---|---|---|
| *H04L 65/1093* | (2022.01) | |
| *G10L 15/26* | (2006.01) | |
| *H04L 12/18* | (2006.01) | |
| *H04L 51/02* | (2022.01) | |
| *H04N 7/15* | (2006.01) | |

(52) U.S. Cl.
CPC ......... *H04L 65/1093* (2013.01); *G10L 15/26* (2013.01); *H04L 12/1822* (2013.01); *H04L 51/02* (2013.01); *H04N 7/15* (2013.01)

(58) Field of Classification Search
CPC . H04L 65/1093; H04L 12/1822; H04L 51/02; H04L 65/403; H04L 51/22; G10L 15/26; H04N 7/15
See application file for complete search history.

(56) References Cited

U.S. PATENT DOCUMENTS

| | | | |
|---|---|---|---|
| 9,704,128 B2 | 7/2017 | Lowrance et al. | |
| 10,742,817 B1* | 8/2020 | White | H04M 3/562 |
| 11,095,579 B1* | 8/2021 | de Mazancourt | G06F 40/40 |
| 2003/0235279 A1* | 12/2003 | Richomme | H04L 12/1822 |
| | | | 379/88.15 |
| 2005/0033807 A1 | 2/2005 | Lowrance et al. | |
| 2011/0072362 A1* | 3/2011 | Denner | G06Q 10/109 |
| | | | 715/751 |
| 2013/0212287 A1* | 8/2013 | Chappelle | H04L 65/1069 |
| | | | 709/227 |
| 2016/0242095 A1* | 8/2016 | Brooksby | G06F 3/0486 |
| 2016/0266864 A1* | 9/2016 | Rajendran | H04L 12/1822 |
| 2018/0131904 A1* | 5/2018 | Segal | H04N 7/15 |
| 2019/0189117 A1* | 6/2019 | Kumar | G06F 16/3329 |
| 2019/0378076 A1* | 12/2019 | O'Gorman | H04M 3/56 |
| 2020/0092519 A1* | 3/2020 | Shin | H04N 7/152 |
| 2020/0110572 A1* | 4/2020 | Lenke | G06F 3/165 |
| 2021/0058264 A1* | 2/2021 | Fahrendorff | H04L 12/1822 |
| 2022/0122603 A1* | 4/2022 | Byeon | G10L 15/22 |

* cited by examiner

*Primary Examiner* — Nam T Tran
(74) *Attorney, Agent, or Firm* — Lathrop GPM LLP

(57) ABSTRACT

A method implements a synthetic moderator. Utterance text is obtained from a conference call that includes a call context. An intent is identified, from the utterance text, for a command. Contextual data is identifying, from the call context, for the command. The command is executed using the contextual data. A result of executing the command is presented.

19 Claims, 14 Drawing Sheets

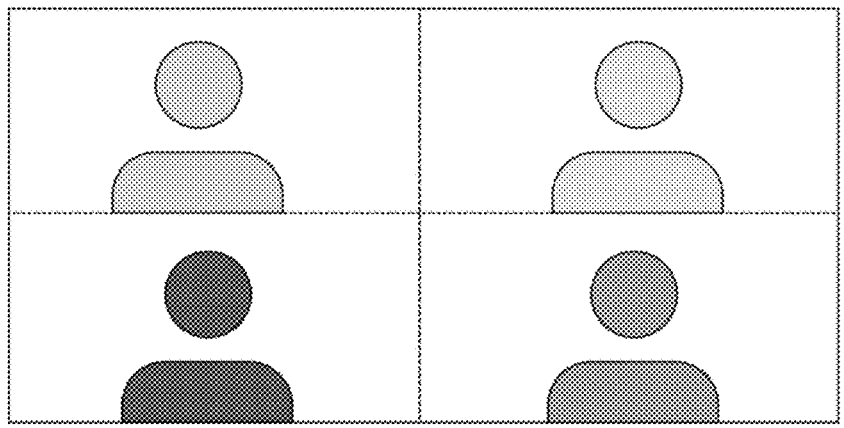
*FIGURE 3B*  ← USER INTERFACE 350
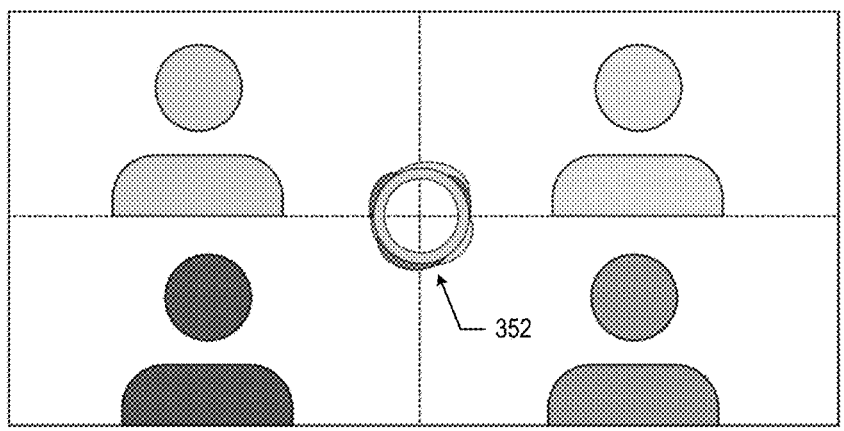
*FIGURE 3C*  ← USER INTERFACE 350
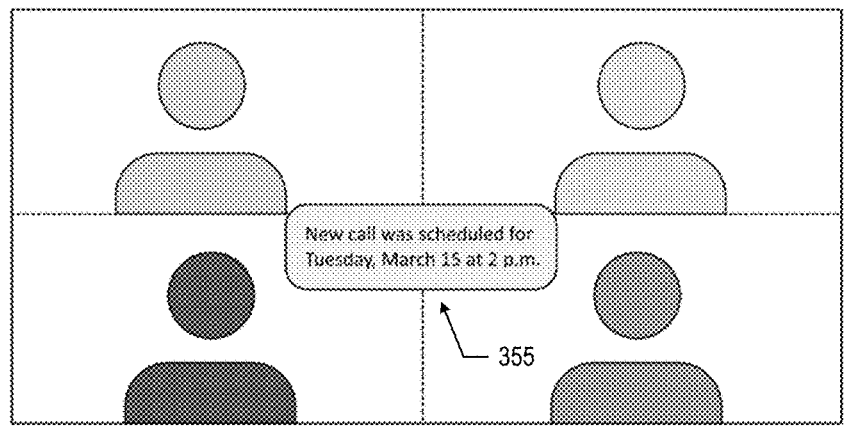
*FIGURE 3D*  ← USER INTERFACE 350

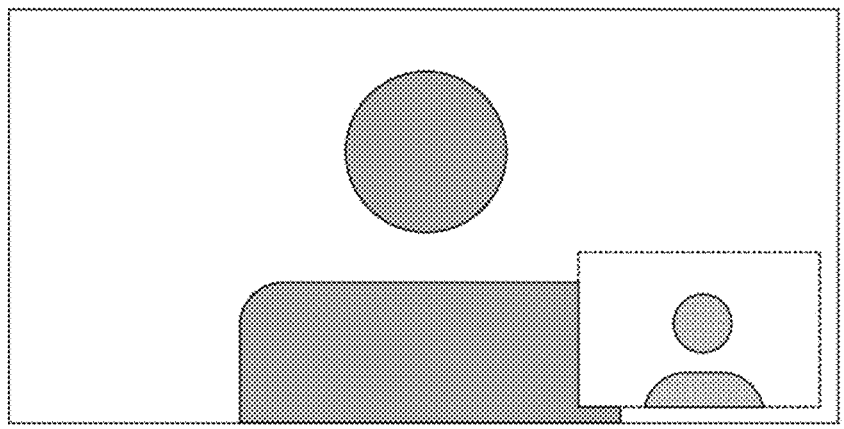
FIGURE 4B — USER INTERFACE 450
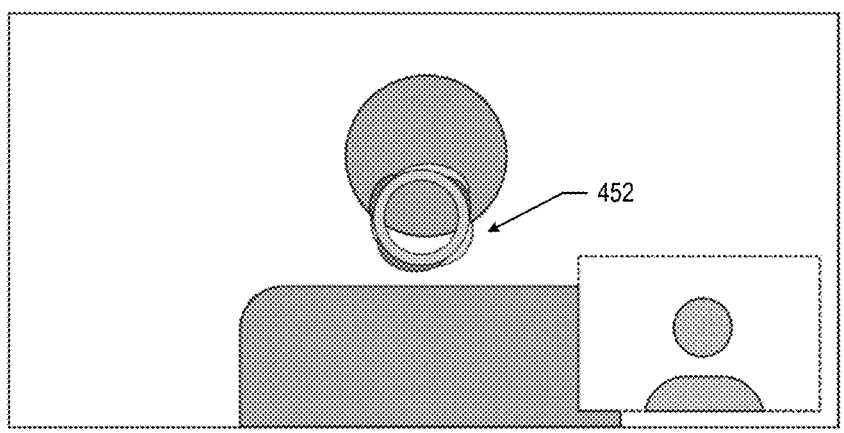
FIGURE 4C — USER INTERFACE 450
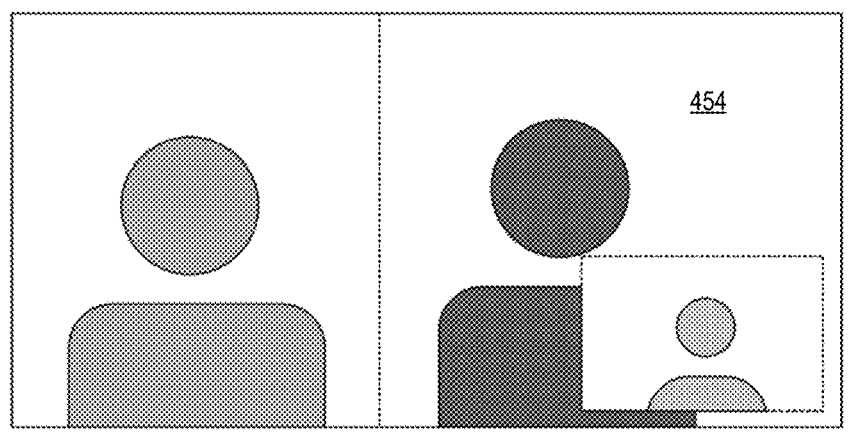
FIGURE 4D — USER INTERFACE 450

SYNTHETIC MODERATOR

BACKGROUND

Video conferencing (also referred to as conference calling) allows multiple participants to interact with each other using video, audio, messages, etc. Manually moderating a conference call by a participant of the call may detract from the purpose of the call. A challenge is to provide systems that automatically moderate the call for the participants of the call.

SUMMARY

In general, in one aspect, one or more embodiments relate to a method implementing a synthetic moderator. Utterance text is obtained from a conference call that includes a call context. An intent is identified, from the utterance text, for a command. Contextual data is identifying, from the call context, for the command. The command is executed using the contextual data. A result of executing the command is presented.

In general, in one aspect, one or more embodiments relate to a system that includes an application executing on at least one processor. Utterance text is obtained from a conference call that includes a call context. An intent is identified, from the utterance text, for a command. Contextual data is identifying, from the call context, for the command. The command is executed using the contextual data. A result of executing the command is presented.

In general, in one aspect, one or more embodiments relate to a method implementing a synthetic moderator. A client device connects to a conference call that includes a call context. utterance text is obtained from the conference call. An intent is identified, from the utterance text, for a command. Contextual data is identifying, from the call context, for the command. The command is executed using the contextual data. A result of executing the command is presented.

Other aspects of the invention will be apparent from the following description and the appended claims.

BRIEF DESCRIPTION OF DRAWINGS

FIG. 3A, FIG. 3B, FIG. 3C, FIG. 3D, FIG. 4A, FIG. 4B, FIG. 4C, FIG. 4D, FIG. 5A, FIG. 5B, FIG. 5C, FIG. 6A, FIG. 6B, FIG. 6C, FIG. 6D, FIG. 6E, FIG. 6F, FIG. 6G, FIG. 6H, FIG. 6I, FIG. 7A, FIG. 7B, FIG. 7C, and FIG. 7D show examples in accordance with disclosed embodiments.

DETAILED DESCRIPTION

Figure 1:
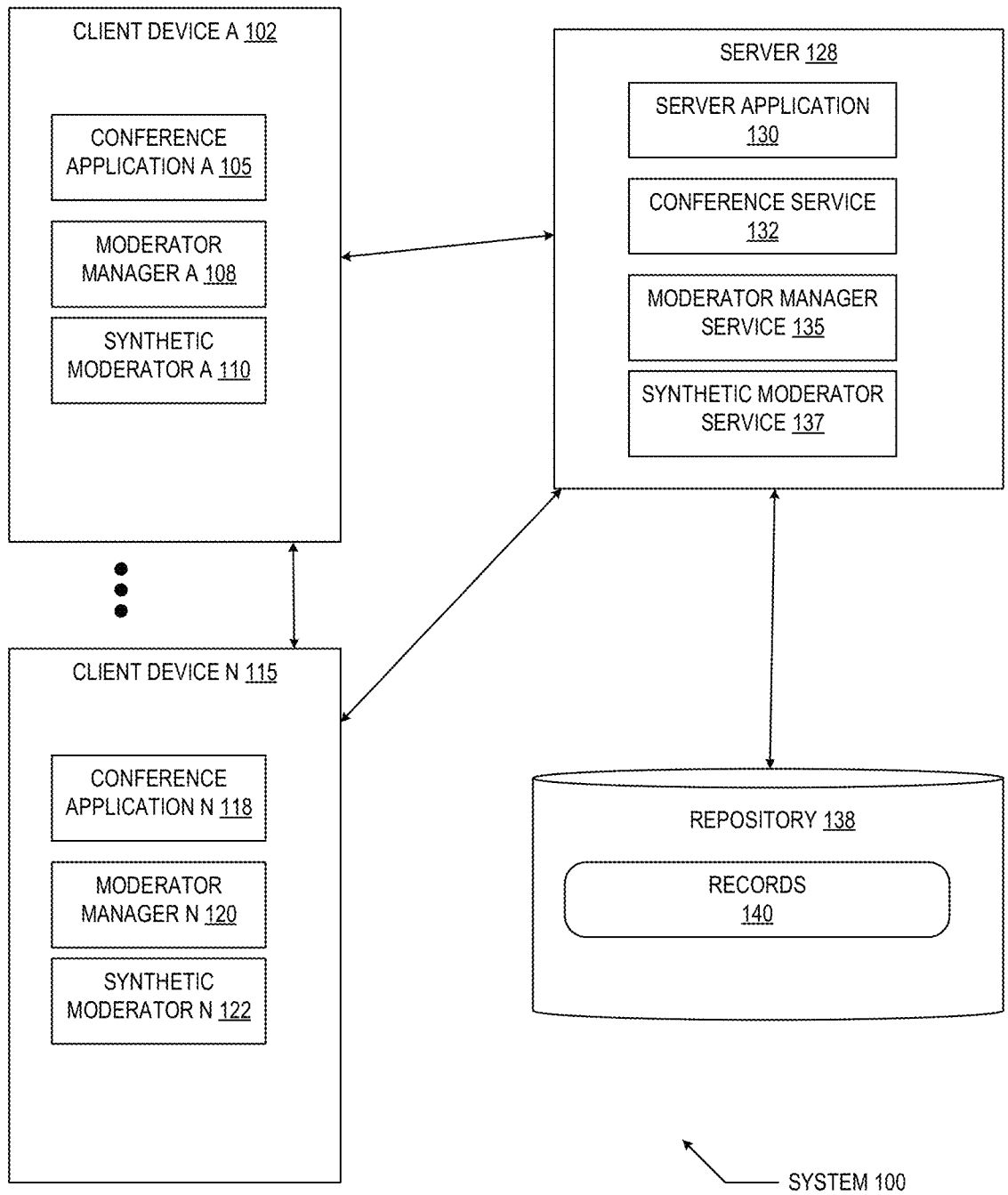
FIG. 1 shows a diagram of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure automatically moderate conference calls for the participants of the calls. A synthetic moderator may be invoked during a call with one or more participants present in the call. Invocation may involve one or more participants pronouncing a phrase (e.g., common activation phrase, user-defined phrase, keyword, any phrase with microphone muted in software, etc.) and interacting with an activation element in the user interface (e.g., activation button, activation slider, toggle, checkbox, interactive image and/or animation, etc.). The moderator manager may begin to receive audio and video streams from one or more participants present in the call. In some implementations, moderator manager may begin to receive textual representation of audio stream (e.g., transcription). For example, the first participant may pronounce activation phrase. Transcription of audio streams of the first, second, and third participants may be sent to moderator manager. In another example, the second participant may press a button on user interface to invoke the synthetic moderator. Audio and video streams of first, second, and third participants may be sent to moderator manager.

In some implementations, one or more participants may receive indication that the synthetic moderator was engaged. The moderator manager may display a visual indication to call participants (e.g., displaying a synthetic moderator icon or animation on the screen, creating participant placeholder for the synthetic moderator, etc.), an audible indication to call participants (e.g., playback of recorded audio, playback of recorded utterance, synthesized greeting speech, etc.), and a textual indication to call participants (e.g., persistent chat message with activation timestamp, call transcript entry, etc.). For example, the first participant may invoke the synthetic moderator by pronouncing an activation phrase (e.g., "hey moderator"), the first, second, and third participants may see an animation on the screen of their devices, the first, second and third participants may hear the synthesized greeting speech spoken by the synthetic moderator, the animation indication may persist on the screen while the synthetic moderator is engaged, the visual indication may be removed when the synthetic moderator is disengaged. In one embodiment, the synthetic moderator speaks by converting text strings to speech that is played into an audio stream added to the call for the synthetic moderator.

In another example, the first participant may have muted microphone and invoke the synthetic moderator by speaking. The first participant may hear a synthesized audio message and the second and third participants may not receive indication of the synthetic moderator being engaged by the first participant. The first participant may interact with the synthetic moderator while second and third participants are not aware of the interaction. The synthetic moderator may unmute the microphone of first participant, the second and third participants may not be aware that microphone was unmuted by the synthetic moderator and not by the first participant directly.

The moderator manager may process the video, audio and text received from one or more participants to extract a requested or expected action (e.g., intent, direct command, request, question, statement, invocation, etc.). In one embodiment, extraction of intent may happen by matching against pre-determined intent templates (e.g., grammar, regular expressions, etc.). In one embodiment, extraction of intent may use fuzzy matching (e.g., machine learning, neural networks, k-nearest neighbors, clustering, etc.).

Zero or more intents may be extracted from a chunk (e.g., sequence of one or more frames of a video, a set of multiple audio sample, an utterance represented by text, etc.) of video, audio and text received by the moderator manager. For example, first participant may request a call to be schedule by speaking it out. The moderator manager may receive a transcription (e.g., textual representation of a spoken phrase and/or sentence) of first participant's utterance. The moderator manager may use regular expressions to match against a template comprising words, phrases, patterns of characters, etc. The moderator manager may find zero or more intent matches in the transcript.

The moderator manager may execute one or more extracted intents and may attempt to gather information and context to execute one or more extracted intents. In some implementations, the moderator manager may gather information and context by making requests to services responsible for such information and context (e.g., database, directory, application programming interface (API), registry, file system, participant device data, etc.). In one embodiment, the moderator manager may request information from one or more participants (e.g., using visual aid, using chat, using synthesized voice, using icons and pictograms, etc.) and gather their submissions (e.g., vocal replies, textual replies, messages, selections, user interface actions, etc.).

For example, the first participant may produce an add participant intent that is identified by the moderator manager. The intent may require a name of a participant to add. The moderator manager may show the first participant a text prompt that may be used by first participant to enter the name of a participant to add. The moderator manager may use entered text to lookup users and contacts of the first participant for a matching name (e.g., exact match, approximate match, Levenshtein distance, last name only, etc.). The moderator manager may execute an add participant intent using the matching user and first participant's contact.

In some implementations, the moderator manager may gather participant submissions to information and context gathering from multiple participants. For example, first participant may initiate call rescheduling intent. The moderator manager may attempt to gather information (e.g., desired call date, desired call time). The moderator manager may send an audible request to each of the call participants for a desired call date and time. The first participant may respond with desired call time with their voice. The second participant may respond with desired day of week with voice. The third participant may respond with desired call date in a chat message. The moderator manager may use gathered information to produce a single (e.g., non-conflicting) call date and time. The moderator manager may repeat information and context gathering if conflicts between context and information are found. The moderator manager may execute the intent once no conflicts are present.

In one embodiment, the moderator manager may produce a response to one or more participants before, during, or after the intent is executed (e.g., after call was scheduled, after participant was added, while information is being gathered from participants, before email is sent to participants, etc.). In one embodiment, the response may be presented with text displayed on participant devices (e.g., dialog message, overlay text, system notification, popup prompt, etc.). In one embodiment, the response may be presented with synthesized and recorded speech (e.g., text-to-speech, generated speech, recorded utterance, etc.).

For example, the first participant may initiate an intent to schedule a call. The moderator manager may gather context and information, execute the intent, and initiate playback of pre-recorded synthesized utterance that may be perceived by one or more connected call participants that the call was scheduled. In one embodiment, the response may be presented with visual indication (e.g., animation of new calendar entry appearing is played).

The moderator manager may record the intent, gather information and context, store a response to persistent storage (e.g., database, file storage, cloud storage, distributed storage, etc.) and use at least some of the recorded information when extracting intents, gathering information and context, executing intents, and producing responses in the future. In one embodiment, the moderator manager may use at least some recorded information to improve accuracy of extracting intents (e.g., recognize commonly used intents, adjust fuzzy matching to include previously unused words and phrases, associate abbreviations, and synonyms to reduce number of information and context gathering stages, etc.). In one embodiment, the moderator manager may use at least some recorded information in context and information gathering stages. For example, the moderator manager may reuse previously gathered context information for executing intents during the same and different calls. In one embodiment, the moderator manager may use at least some recorded information when producing responses (e.g., use different phrases to mean same thing to avoid repetition, use similar language when producing responses to consecutive intents and information gathering stages, produce personalized responses based on context and information about call participants, etc.).

In one embodiment, the moderator manager may create delayed intents. The moderator manager may store the intent, the information and context for executing the intent, execution moment (e.g., call phase, after keyword and trigger word is spoken and appears in a message, specific date and time, etc.), as well as other relevant information, in storage (e.g., temporary storage, operational storage, persistent storage, database, etc.).

The moderator manager may execute one or more delayed intents at execution moments during and after the call. The moderator manager may produce a response (e.g., audio response, recorded utterance playback, text response) and other type of completion notification (e.g., instant message, push notification, email message, text message, on-screen indication, user interface indication, etc.) that may contain intent execution results (e.g., date of next call, bullet point summary, call reports, etc.).

For example, the first participant may initiate an intent for spoken call points to be summarized and distributed to one or more call participants before and after the call ends. The moderator manager may execute an intent right away (e.g., begin recording call audio and video streams for each participant, begin transcribing call audio from one or more participants, begin recording chat messages sent by call participants, etc.). Additionally, the moderator manager may create a delayed intent to produce and distribute call points summary for an execution moment before and after the end of the call. The moderator manager may execute the delayed intent at an execution moment (e.g., when the call ends, when last participant disconnects, when one or more participants indicate the call has ended by interacting with user interface elements, etc.). The moderator manager may produce a response to one or more participants as result of executing the delayed intent. The moderator manager may produce the execution report that may be sent (e.g., on-screen report, email notification, push notification, etc.) to one or more participants that initiated the original intent that led to creation of delayed intent.

In one embodiment, a first participant may produce a call transfer intent that is identified by the moderator manager. The intent may require a name of the device (e.g., device type, user-defined device name, device location name, relative device location description, etc.) to which the call may be transferred. The moderator manager may execute a call transfer intent using the device name. The state and context of the moderator manager may be transferred to the device.

In one embodiment, the moderator manager uses strings of structured text (e.g., JavaScript object notation (JSON) text). The strings are used to communicate with the rest of the system.

For example, in response to a synthetic moderator being engaged on a client device the message below may be received by the moderator manager:

```
{
    "activated": true,
    "private": true/false
}
```

The value "private" is a Boolean value (e.g., true or false) that may indicate whenever input from other participants may be processed by the moderator manager. As an example, if private is set to true, second and third participants may not reply to information requests made by the moderator manager.

The message below may be sent from the moderator manager to other participants after the synthetic moderator is engaged by one of the participants with private=false.

```
{
    "activated": true,
    "utterance": "Moderator speaking" (Optional)
}
```

The above message may be sent to provide an indication to other participants that the moderator manager is engaged. In one embodiment, the above message may indicate that input from other participants may be processed by the moderator manager. The moderator manager may extract intents, collect information and contexts, and prepare to execute the commands related to intents.

An optional utterance parameter may be used by the moderator manager to pass custom textual message with an activation indication message to a participant. In one embodiment, the optional utterance parameter may be used as text-to-speech system input by one or more participants to produce audible activation indication.

The following message may be sent from the moderator manager to every participant when information and/or context gathering occurs.

```
{
    "utterance": "At what time should we have the call?",
    "gather_id": "unique identifier" (Optional)
}
```

The message above contains an utterance parameter that may be used by the moderator manager to pass custom textual message with information and context requests to one or more participants. In one embodiment, the custom textual message may be used as text-to-speech system input by one or more participants to produce audible information and context request. The message may also contain an optional "gather_id" parameter, which may be used by the moderator manager to associate participant responses with information gathering requests associated with intents.

The following message may be sent from the moderator manager to an external application programming interface (API) (for example to get participant schedules) when information or context gathering occurs.

```
{
    "participant_emails": ["email1@domain1.com",
"email2@domain2.com"],
    "date_range": [1627000000, 1628000000] (Optional)
}
```

The message may contain API-specific parameters. For example, it may contain "participant_emails" parameters that may contain list of call participant emails, message may optionally contain "date_range" (e.g., the moderator manager has gathered information that the call to schedule is to happen on a specific week, such as "next week") that may be of type Unix timestamp.

A response to the message above is shown below:

```
[
    {
        "participant_email": "email2@domain2.com",
        "scheduled_events": [
            {
                "start": 1627100000,
                "end": 1627200000
            }
        ]
    }
]
```

The response message above may contain a list with zero or more entries, for each requested participant email. Each participant entry may contain start and end times in Unix timestamp format of future scheduled events. If the "date_range" parameter is specified in the preceding request message, then the response message may contain the events in that time range.

FIG. 1 shows a diagram of embodiments that are in accordance with the disclosure. FIG. 1 shows a diagram of the system (100) that implements synthetic moderation. The embodiments of FIG. 1 may be combined and may include or be included within the features and embodiments described in the other figures of the application. The features and elements of FIG. 1 are, individually and as a combination, improvements to synthetic moderation technology and computing systems. The various elements, systems, and components shown in FIG. 1 may be omitted, repeated, combined, and/or altered as shown from FIG. 1. Accordingly, the scope of the present disclosure should not be considered limited to the specific arrangements shown in FIG. 1.

Turning to FIG. 1, the system (100) synthetically moderates conference calls. The system (100) includes the client devices A (102) through N (115), the server (128), and the repository (138). A conference call (also referred to as a call) include multiple video and audio streams shared in real time between the client devices A (102) and N (115) using the conference applications A (105) and N (118). A conference call allows the participants of the call (the users of the client devices A (102) through N (115)) to communicate vocally and visibly. With a client server model, the conference service (132) may facilitate a call between the client devices A (102) and N (115). The conference call may utilize multiple standards and protocols, including audio standards (G.711, G.722, G.728, G.729, Opus, etc.), video standards (H.261, H.262, MPEG-2, H.263, H.264, MPEG4, AVC, HEVC, VP8, VP9, etc.), data standards (e.g., T.120), network protocol standards (TCP/IP, HTTP, HTTPS, UDP, etc.), etc.

Figure 8A:
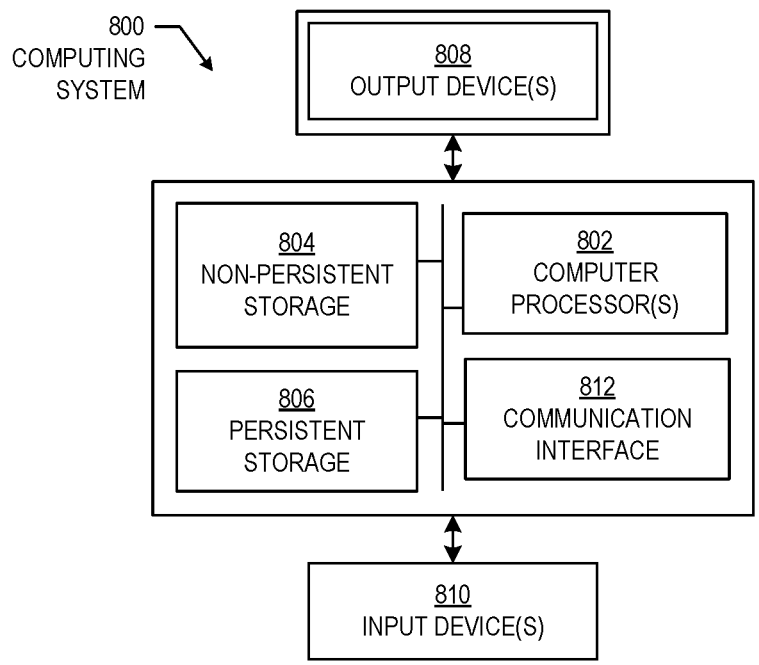
FIG. 8A and FIG. 8B show computing systems in accordance with disclosed embodiments.

The client devices A (102) and N (115) are computing systems (further described in FIG. 8A). For example, the client devices A (102) and N (115) may be desktop computers, mobile devices, laptop computers, tablet computers, on-board computers, etc. In one embodiment, the client device A (102) may be used by a user (also referred to as a participant of a call) to initiate or join a conference call with the client device N (115). The client devices A (102) and N (115) respectively include several hardware and software components (e.g., processors, memory, programs, etc.). For example, the client devices A (102) and N (115) respectively include the conference applications A (105) and N (118), the moderator managers A (108) and N (120), the synthetic moderators A (110) and N (122). Similarly named components of the client devices A (102) and N (115) may operate in a similar fashion.

The conference application A (105) sends and receives audio, video, and data for a conference call. For example, the conference application A (105) may receive audio and video input streams from cameras and microphones of the client device A (102) and share the audio and video input streams with the client device N (115). The data may include chat messages sent between participants.

The moderator manager A (108) moderates calls placed using the conference application A (105). The moderator manager A (108) receives user inputs, identifies intents, and produces results. In one embodiment, the moderator manager A (108) receives utterance text, which is a transcription of speech from a user. The utterance text is analyzed to identify intents and to process commands from the intents.

In one embodiment, the moderator manager A (108) may monitor the audio levels of the audio streams that are part of a conference call to which the client device A (102) is connected. The audio level may be used to identify when a person is speaking in an audio stream.

The synthetic moderator A (110) provides outputs to a call that are generated by the moderator manager A (108). For example, the synthetic moderator A (110) may initiate a new audio stream on a call to play a greeting message after the moderator manager A (108) detects an activation phrase in utterance text from a user of the client device A (102).

The server (128) is a computing system (further described in FIG. 8A). The server (128) may include multiple physical and virtual computing systems that form part of a cloud computing environment. In one embodiment, execution of the programs and applications of the server (128) is distributed to multiple physical and virtual computing systems in the cloud computing environment. The server (128) includes several hardware and software components (processors, memory, programs, etc.), including the server application (130), the conference service (132), the moderator manager service (135), and the synthetic moderator service (137).

The server application (130) provides centralized access to data and streams used by the system. In one embodiment, the server application (130) hosts a website accessible to the client devices A (102) and N (115) that provides functionality for conference calls, calendaring, scheduling, contact tracking, etc.

The conference service (132) may be used in a client server model to host a conference call between the client devices A (102) and N (115). The conference service (132) may receive and share audio, video, and data streams between the client devices A (102) and N (115).

The moderator manager service (135) may operate in a client server model as a moderator manager for calls between the client devices A (102) and N (115). The moderator manager service (135) may detect user inputs, identify intents, and provide results.

The synthetic moderator service (137) may operate in a client server model as a synthetic moderator for calls between the client devices A (102) and N (115). The synthetic moderator service (137) provides outputs to a call that are generated by the moderator manager service (135). For example, the synthetic moderator service (137) may initiate a new audio stream on a call to play a greeting message after the moderator manager service (135) detects an activation phrase in utterance text from a user of the client device A (102).

The repository (138) is a computing system that may include multiple computing devices in accordance with the computing system (800) and the nodes (822) and (822) described below in FIGS. 8A and 8B. The repository (138) may be hosted by a cloud services provider that also hosts the server (128). The cloud services provider may provide hosting, virtualization, and data storage services as well as other cloud services and to operate and control the data, programs, and applications that store and retrieve data from the repository (138). The data in the repository (138) includes the records (140).

The records (140) are electronic files stored in the repository (138). The records (140) include data calendars, contacts, schedules, etc. The records (140) are used by the system to schedule and set up conference calls between the client devices A (102) through N (115).

Figure 2:
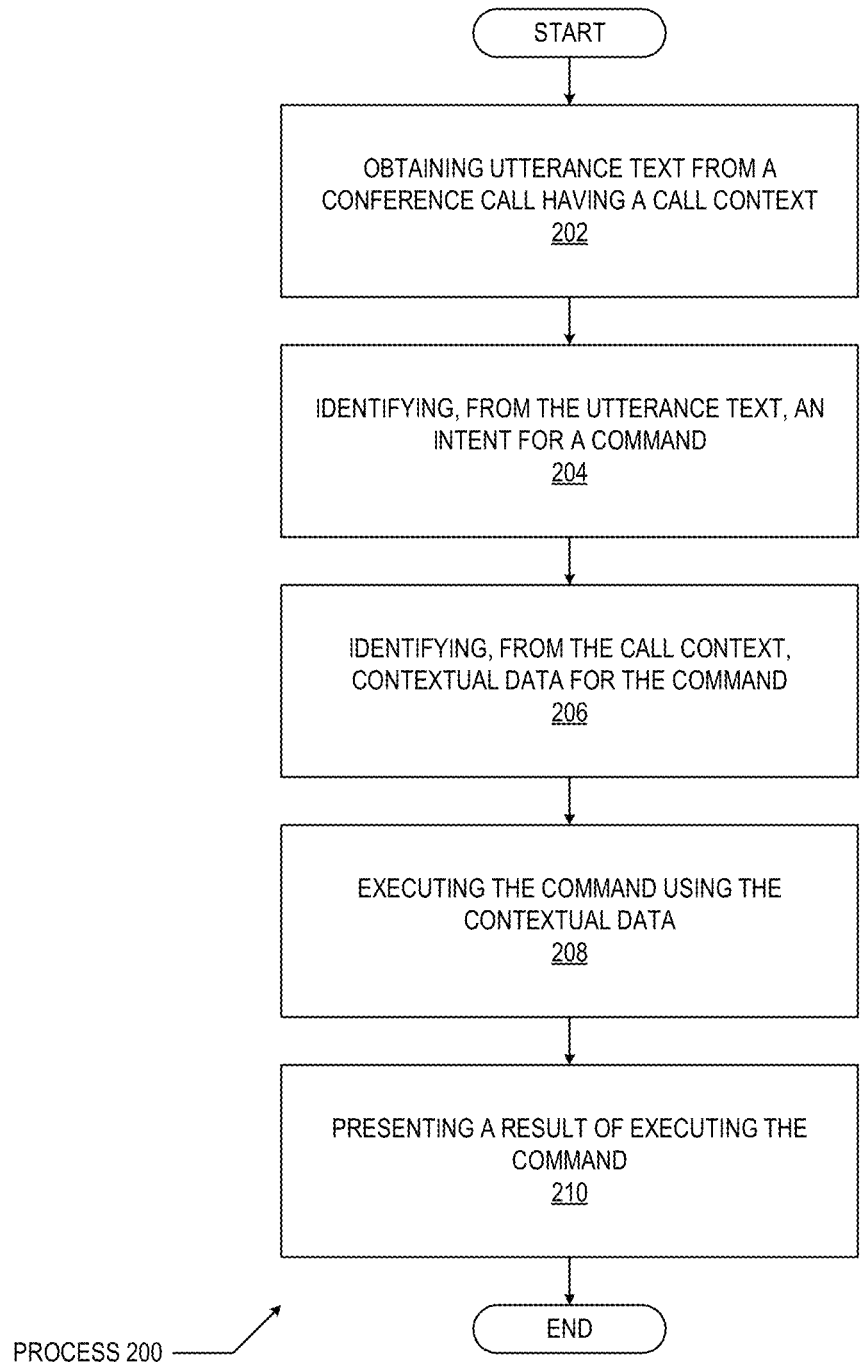
FIG. 2 shows a flowchart in accordance with disclosed embodiments.

FIG. 2 shows a flowchart of synthetic moderation. Embodiments of FIG. 2 may be combined and may include or be included within the features and embodiments described in the other figures of the application. The features of FIG. 2 are, individually and as an ordered combination, improvements to synthetic moderation technology and computing systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 2, the process (200) synthetically moderates a call. The process (200) may execute on a client device or on a server.

At (202), utterance text is obtained from a conference call that includes a call context. The call context may include a call identifier, a set of participant identifiers corresponding to a set of participants of the call, a mute status of a participant of the set of participants, etc. The call identifier is a value that uniquely identifies one call from the other calls that may be placed using the system. The participant identifiers are values that uniquely identify the participants of a call. The mute status is a value that identifies whether the audio stream of a participant is muted (no sound being transmitted) or unmuted (sound transmission is enabled).

In one embodiment, the utterance text is obtained by receiving an audio stream with speech and transcribing the speech from the audio stream to text. Transcription programs generating the utterance text may continuously transcribe speech from the audio streams of the call. In one embodiment, a moderator manager receives the utterance text from transcription program. In one embodiment, a moderator manager receives zero or more alternative transcriptions for the same audio stream. In one embodiment, a moderator manager includes the transcription program and process the audio stream to generate utterance text. In one embodiment, the audio stream is a second audio stream from a second client device.

In one embodiment, the utterance text may be received as a text input from a participant. For example, a participant may input a text string to a client device that is received by the system and processed as the utterance text in addition to or in lieu of generating the utterance text from the transcription of speech of the participants of a call.

At (204), intents are identified from utterance text for commands. One or more intents may be identified from utterance text by a moderator manager. A command is a set of instructions executed by a moderator manager in response to intents identified from the inputs (speech, text, etc.) of participants of a call. In one embodiment, a command may include function calls to an application programming interface (API). For example, an intent may be identified that maps to the command for unmuting an audio stream. The moderator manager may call the unmute function of an API for the conference call in response to the intent identified from the speech of a participant.

In one embodiment, an intent may be one of a set of intents. Each intent may include a name, a set of trigger strings, a set of commands, etc. The set of trigger strings are strings that, when recognized by the moderator manager, trigger execution of the one or more commands associated with an intent.

In one embodiment, the intent is identified using a chatbot. The chatbot is a program that conducts a conversation with a person in lieu of providing direct contact with a live human agent. To identify the intent from the utterance text, the utterance text is sent as an input to the chatbot. The chatbot processes the utterance text and returns the intent. The intent may be received as an output from the chatbot as a text string. The output from the chatbot is mapped to a command, which is further processed by the moderator manager.

At (206), contextual data for the command is identified from the call context. The contextual data may include a call identifier, a set of participant identifiers, a mute status of a participant, etc.

In one embodiment, non-contextual data for the command may be transcribed and identified. Subsequent speech is transcribed from an audio stream to form subsequent text. The non-contextual data is identified for the command from the subsequent text. The subsequent speech may be from the participant that triggered the moderator manager. In one embodiment, the subsequent speech is received from a second audio stream of the conference call corresponding to a second participant. The non-contextual data for the command may be a subsequent participant identifier, a date value, a time value, etc.

At (208), commands are executed using the contextual data. The system may be configured to execute multiple different commands. In one embodiment, executing the command adds a subsequent participant to the conference call using a subsequent participant identifier from non-contextual data. In one embodiment, executing the command schedules an ensuing conference call using the contextual data and non-contextual data. In one embodiment, executing the command unmutes an audio stream of the conference call. In one embodiment, executing the command transfers a call from a first client device of a first participant to a second client device of the first participant.

At (210), a result of executing the command is presented. The result may indicate that an ensuing call has been scheduled, may show a new person being connected to the current call, may show a change in mute status, may show an agenda or summary, etc. In one embodiment, the result is presented by a synthetic moderator creating a new audio stream to play audio messages to one or more of the participants. In one embodiment, the result may be overlaid onto video stream of the participant that triggered the moderator manager. In one embodiment, the result may be displayed in a new video stream.

FIGS. 3A through 3D, 4A through 4D, 5A through 5C, 6A through 6I, and FIGS. 7A through 7D show examples of sequences and interfaces of synthetic moderators. FIGS. 3A through 3D show an example of scheduling an ensuing call with synthetic moderation. FIGS. 4A through 4D show an example of adding a participant with synthetic moderation. FIGS. 5A through 5C show an example of unmuting a device using synthetic moderation. FIGS. 6A through 6I show an example of processing multiple intents for agenda and summary functionality using synthetic moderation. The embodiments shown in FIGS. 3A through 3D, 4A through 4D, 5A through 5C, 6A through 6I, and FIGS. 7A through 7D may be combined and may include or be included within the features and embodiments described in the other figures of the application. The features and elements of FIGS. 3A through 3D, 4A through 4D, 5A through 5C, 6A through 6I, and FIGS. 7A through 7D are, individually and as a combination, improvements to synthetic moderation technology and computing systems. FIGS. 7A through 7D show an example of transferring a call between devices using synthetic moderation. The various features, elements, widgets, components, and interfaces shown in FIGS. 3A through 3D, 4A through 4D, 5A through 5C, 6A through 6I, and FIGS. 7A through 7D may be omitted, repeated, combined, and/or altered as shown. Accordingly, the scope of the present disclosure should not be considered limited to the specific arrangements shown in FIGS. 3A through 3D, 4A through 4D, 5A through 5C, 6A through 6I, and FIGS. 7A through 7D.

Figure 3A:
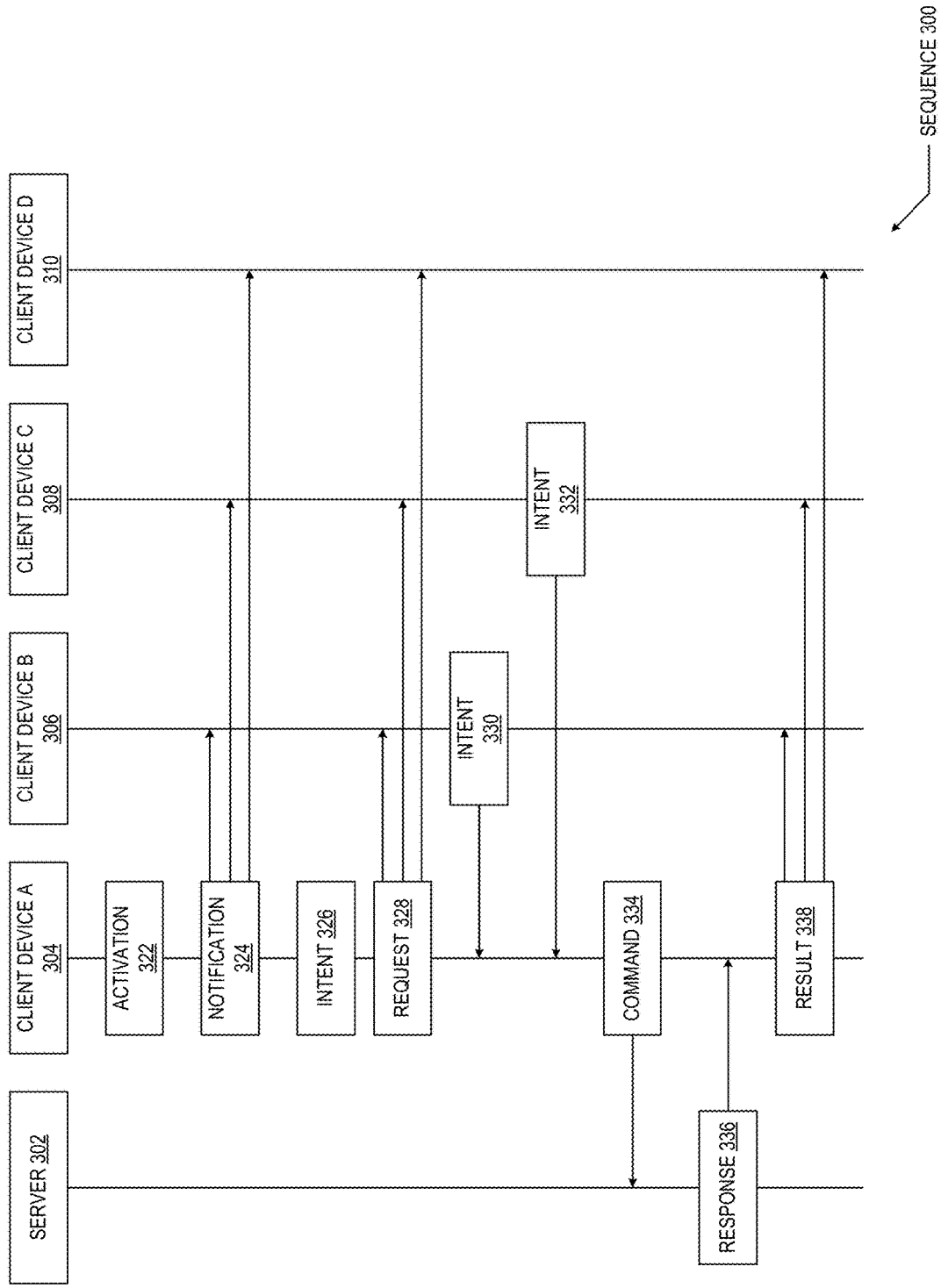

Turning to FIG. 3A, the sequence (300) schedules an ensuing call. The sequence (300) is performed by the server (302), the client device A (304), the client device B (306), the client device C (308), and the client device D (310).

A first participant (using the client device (304)) may be taking part in a scheduled video conference call with three other participants (using the client devices B (306) through D (310)). The first participant uses the client device (304), which displays the user interface of FIG. 3B. Before the call is scheduled to end, the third participant of the client device C (308) may initiate discussion about when next call may be held.

The first participant of the client device A (304) may pronounce a keyword phrase triggering the activation (322) that may engage a synthetic moderator operating on the client device A (304). The moderator manager may receive the notification message about synthetic moderator being engaged and moderator manager may activate transcription of audio from each of the call participants. The moderator manager executes on the client device A (304). In one embodiment, the moderator manager may execute on the server (302).

The moderator manager may produce the notification (324) (shown on the user interface (350) of FIG. 3C). The notification (324) is presented as an audible response with a greeting phrase that each of the participants may be able to hear on the client devices A (304) through D (310).

The first participant may speak the phrase containing the intent (326) to reschedule the present conference call. The moderator manager may use the audio transcription from the first participant to extract the intent and begin gathering information and context for executing the intent of rescheduling a call. The moderator manager may gather the list of call participants to invite from the list of participants in the current call.

The moderator manager generates the request (328). The request (328) may be presented as an audible request for information that the first, second, third, and fourth participants will hear on the client devices A (304) through D (310). The request may include an utterance asking for date and/or time of the call to be scheduled.

The second participant may speak out the utterance "same time as this call". The moderator manager may process the received transcription of that spoken phrase, identify the intent (330) to identify a time for the ensuing call, and proceed to extract the time from the current call details and use the same time for setting up the ensuing call.

The third participant may speak out "next Tuesday". The moderator manager may process the received transcription of that spoken phrase and identify the intent (332) to identify a date for the ensuing call. The moderator manager resolves the day of week to a full date and uses the full date for scheduling the ensuing call.

The moderator manager may execute the command (334) for the intent (326) once information from contextual data (e.g., the current participants) and non-contextual data (e.g., the date and time of the ensuing call) have been gathered. The moderator manager may make a request to an application programming interface (API) endpoint of the video conference service executing on the server (302).

The server (302) generates the response (336). The response (336) is transmitted to the client device A (304).

The moderator manager on the client device (304) produces a result that may identify the resolved scheduled call date and time. The result may be displayed on the client devices A (304) through D (310) (shown in FIG. 3D). Additionally, the result may be contained in an affirmation email and text notification sent to one or more participants. The moderator manager may have each of the current call participants hear the response on their devices. The moderator manager may continue to process the audio transcripts from each of the participants for the next four seconds, before disengaging synthetic moderator if no more intents are extracted or if intent to disengage synthetic moderator is extracted from one or more transcripts.

Turning to FIG. 3B, the user interface (350) is displayed on the client device A (304) (of FIG. 3A). The user interface (350) shows the four participants of the call.

Turning to FIG. 3C, the user interface (350) is updated to show the icon (352). The icon (352) is a visual representation of the notification (324) of FIG. 3A.

Turning to FIG. 3D, the user interface (350) is updated to show the text (354). The text (354) is a visual representation of the result (338) of FIG. 3A.

Figure 4A:
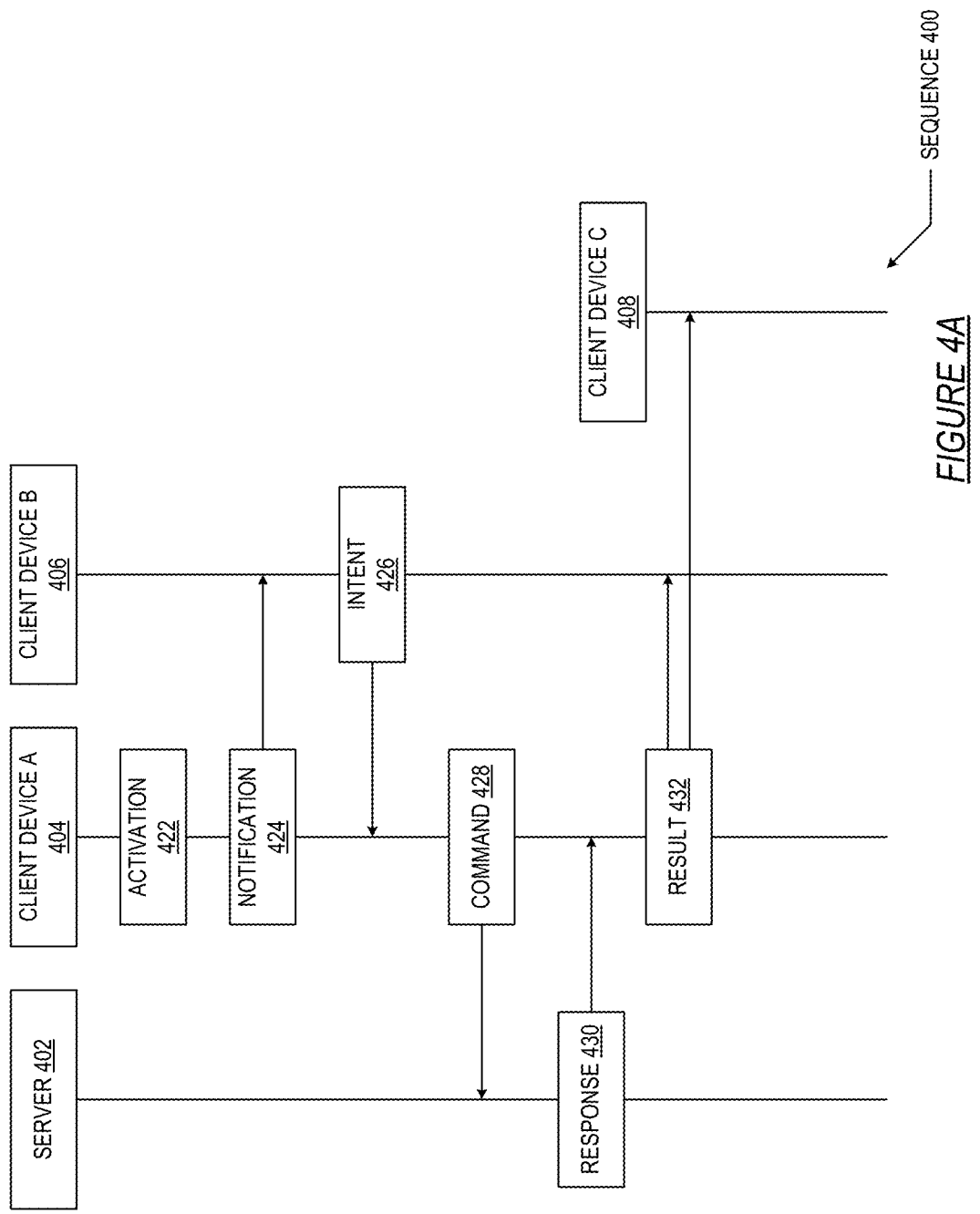
Figure 5A:
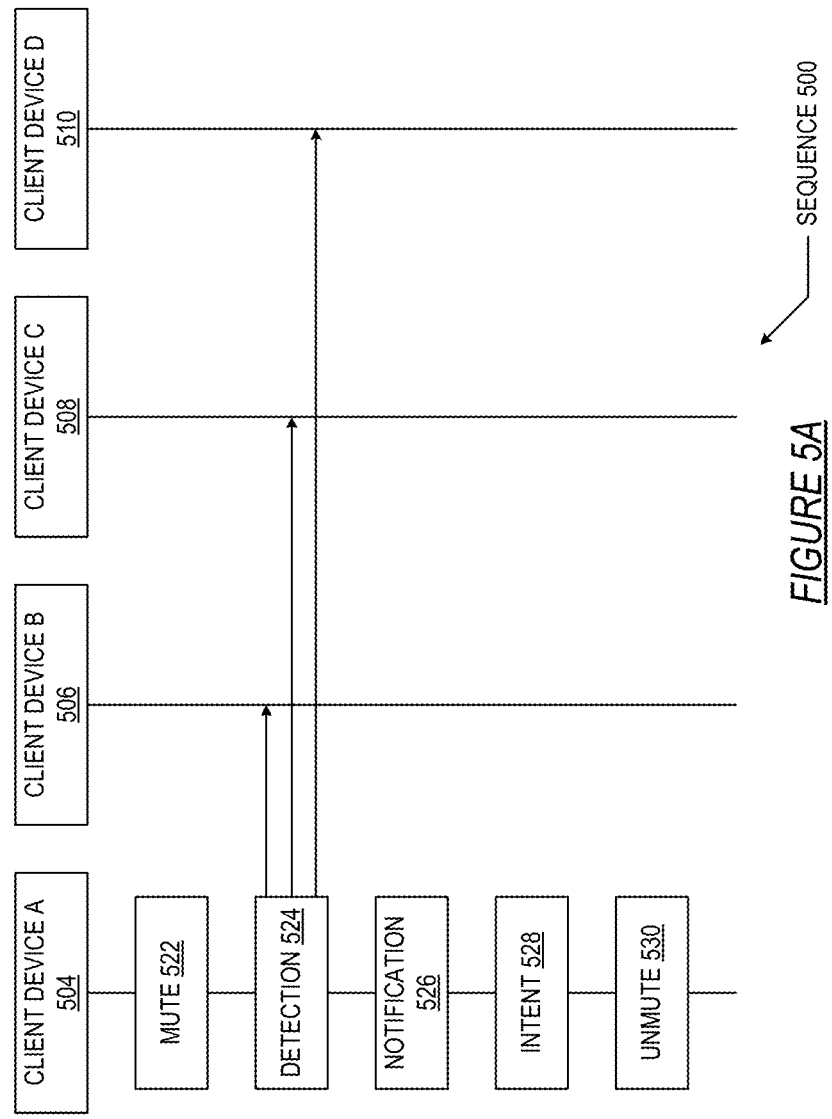
Figure 5B:
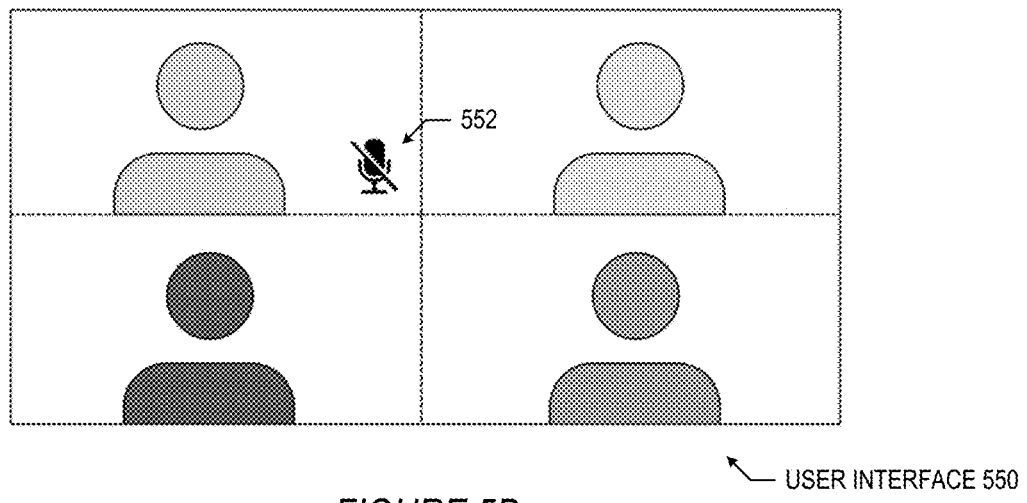
Figure 5C:
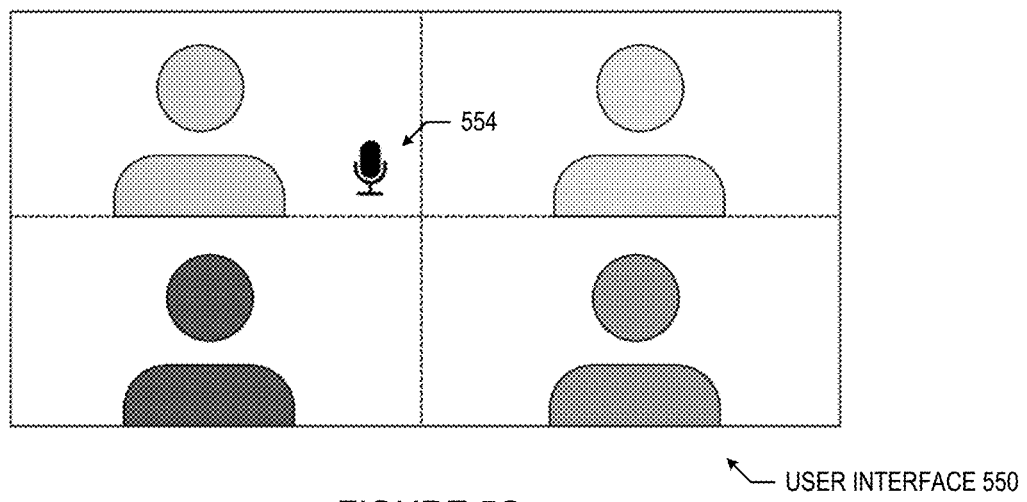

Turning to FIG. 4A, the sequence (400) schedules add a participant to a call. The sequence (400) is performed by the server (402), the client device A (404), the client device B (406), and the client device C (408).

A first participant (using the client device A (404)) may be taking part in a video call (shown in FIG. 4B) with one other participant (using the client device B (406)). The second participant may propose a third participant be added to the call. The first participant may pronounce a phrase triggering the activation (422) that engages the synthetic moderator.

The synthetic moderator generates the notification (424) that includes a visual animation (shown in FIG. 4C) that may be displayed on screens of the client device A (404) and the client device B (406). The synthetic moderator may produce synthesized greeting utterance that may be heard by both first and second participants. The moderator manager on the client device A (404) may initiate transcription of audio from both first and second participants.

The second participant may speak out the intent (426) to add a person to the call by naming the new participant. The moderator manager may receive the transcription containing the spoken words of the second participant. The moderator manager may process the transcription and it may extract the intent (426). The moderator manager may process the same transcript and extract information used to execute the intent, namely the name of participant to add. The moderator manager may gather context used to execute the intent, namely the unique call identifier where the participant is to be added to.

The moderator manager executes the command (428) based on the intent (426) to add a new participant to the call. The participant may be added by invoking an API of the group video call service.

The moderator manager receives the response (430) from the server (402). The response (430) may indicate the success of adding the new participant.

The moderator manager generates the result (432) with audible indication that participant is added to the call (shown in FIG. 4D). The moderator manager may remain engaged for three seconds after producing an audible response, after which, if none of the participants had engaged with synthetic moderator by producing a new recognized intent, the synthetic moderator may disengage.

Turning to FIG. 4B, the user interface (450) is displayed on the client device A (404) (of FIG. 4A). The user interface (450) shows the two participants of the call.

Turning to FIG. 4C, the user interface (450) is updated to show the icon (452). The icon (452) is a visual representation of the notification (424) of FIG. 4A.

Turning to FIG. 4D, the user interface (450) is updated to show the video stream (454). The video stream (454) displays the third participant using the client device C (408) of FIG. 4A.

Turning to FIG. 5A, the sequence (500) changes the mute status of the client device A (504). The sequence (500) is performed by the client device A (504), the client device B (506), the client device C (508), and the client device D (510).

A first participant (of the client device A (504)) may be taking part in a video call with three other participants (of the client devices B (506), C (508), and D (510)). The first participant may have muted (522) the microphone of the client device A (504) using software mute functionality (illustrated in FIG. 5B). The call may be configured to have moderator manager monitor microphone audio levels.

The second participant may ask the first participant a question. The first participant may start replying to the question without unmuting microphone of the client device A (504).

The moderator manager of the client device A (504) may detect the first participant speaking while device microphone is muted at the detection (524). The moderator manager may also detect that none of the other participants are speaking. The moderator manager may engage the synthetic moderator to produce an audible activation indication for first participant. The second and third participants may not receive any visual or any other explicit indication that synthetic moderator was engaged for the first participant.

The moderator manager generates the notification (526) to produce an audible greeting phrase "would you like to unmute the microphone?" that may only be audible to the first participant. The moderator manager may activate processing of audio spoken by the first participant.

The first participant signals the intent (528) pronounced as an affirmative reply. The moderator manager may interpret the affirmative reply based on the context as an intent request to unmute the microphone of the first participant.

The moderator manager may produce an API call to video conferencing service with a request to unmute (530) the microphone of the first participant. The moderator manager may immediately disengage synthetic moderator without producing any response to the first participant. Second and third participants may notice that the microphone state indication for the first participant changed from muted to unmuted (shown in FIG. 5C). The first participant may continue answering the question immediately.

Turning to FIG. 5B, the user interface (550) is displayed on the client device A (504) (of FIG. 5A). The user interface (550) shows the four participants of the call. The mute icon (552) indicates that the audio stream of the first participant of the first client device A (504) (of FIG. 5A) is muted.

Turning to FIG. 5C, the user interface (550) is updated to show the unmute icon (554). The unmute icon (554) indicates that the audio stream for the first participant is not muted and may be heard by the other participants.

Figure 6A:
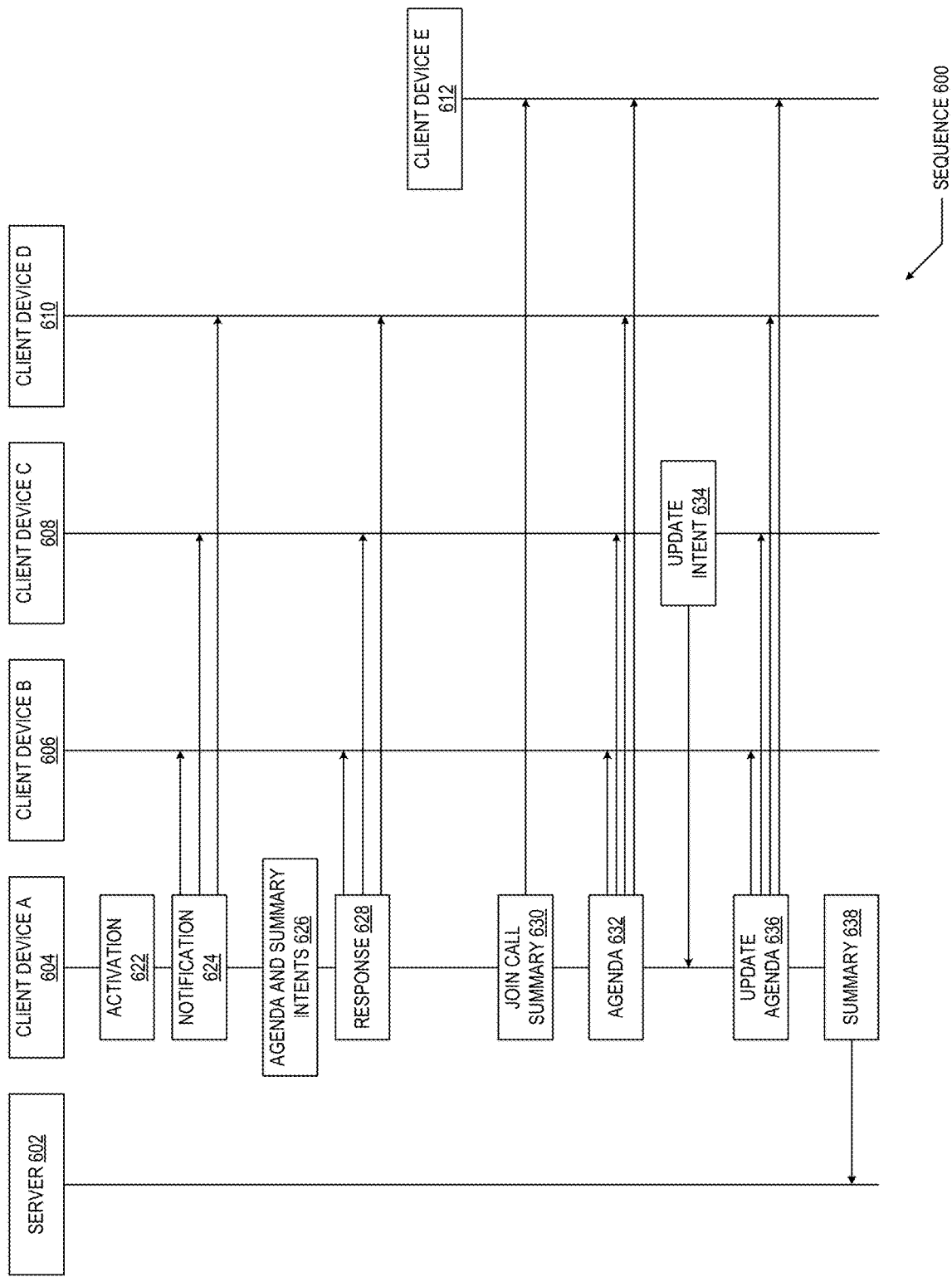

Turning to FIG. 6A, the sequence (600) performs agenda and summary functions. The sequence (600) is performed by the server (602), the client device A (604), the client device B (606), the client device C (608), the client device D (610), and the client device E (612).

A first participant (using the client device A (604)) may participate in a video conference call with four other participants (using the client devices B (606), C (608), D (610), and E (612)). The first, second, third and fourth participants may join the call on scheduled time (shown in FIG. 6B). The fifth participant (using the client device E (612)) may join the call ten minutes late.

The first participant may engage the activation (622) of the synthetic moderator immediately after joining the call. The first participant may use a trigger phrase that the first participant previously selected.

Figure 6B:
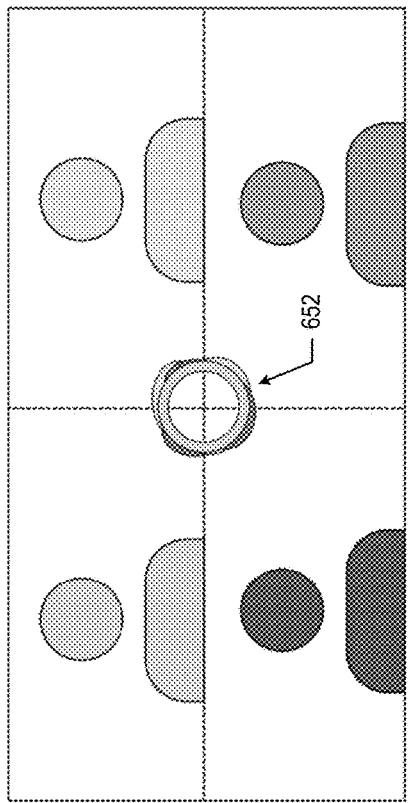
Figure 6C:
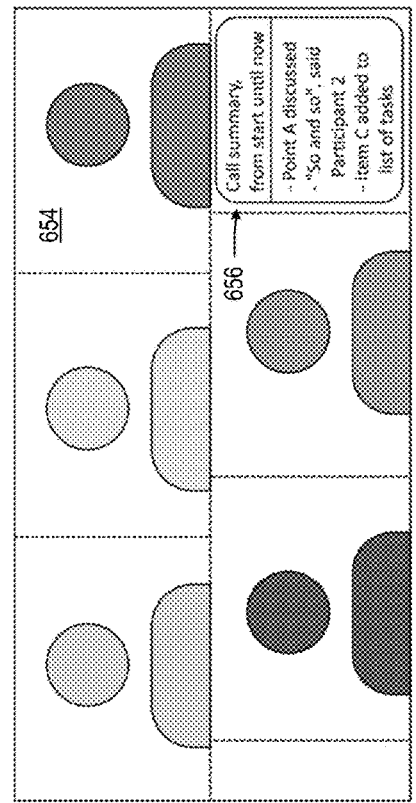

The moderator manager may send the notification (624) to each of the present participants (shown in FIG. 6C). The moderator manager may activate transcription of audio streams from each of the participants that may have already joined the call. The moderator manager may activate transcription of audio streams of newly joined and rejoined (e.g., reconnecting after network interruption, reconnecting after device change, reconnecting after device restart, etc.) participants immediately after the participants join the call.

The first participant may speak out the intents (626) to enable one or more synthetic moderator group call functionalities, for example summary functionality and meeting agenda functionality. The moderator manager may process the transcript of the first participant audio stream and extract the intents (626) to activate two synthetic moderator functionalities.

The moderator manager may generate the response (628) to produce an audible response for each of the participants present in the call. The response (628) may contain affirmation that functionality was enabled. The moderator manager may execute the intents. For summary functionality, the moderator manager may begin to record and persistently store the transcript from each of the participants. For meeting agenda functionality, the moderator manager may make use of API functionality to load a list of topics that is associated to this scheduled conference call from video conferencing service.

The moderator manager may disengage the synthetic moderator (see FIG. 6D) and create delayed intent to support summary functionality and/or meeting agenda functionality. For example, summary functionality may have an intent to be executed at execution moment when a participant joins the schedules call late, such as the fifth participant.

Figure 6D:
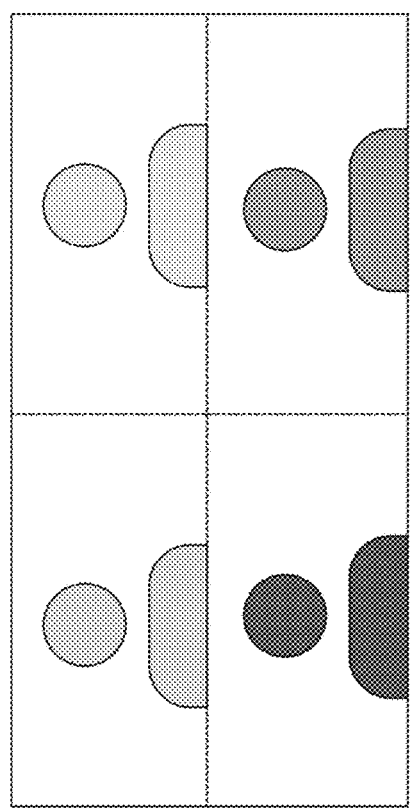
Figure 6E:
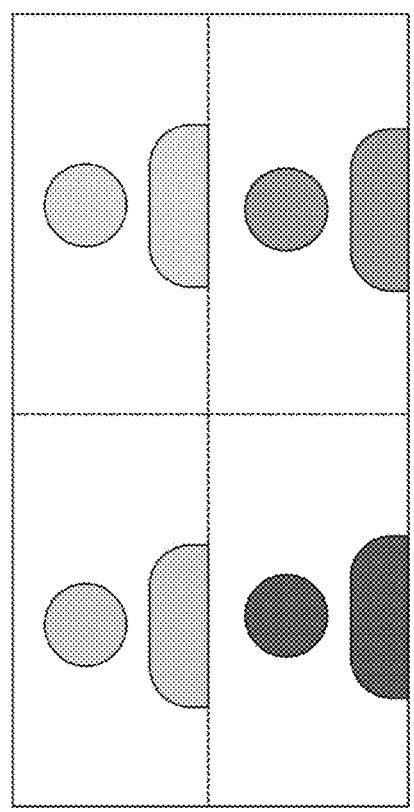

When fifth participant joins the call, the moderator manager may execute the join call summary (630) intent and privately display the results to fifth participant without displaying the results to the first through fourth participants (shown in FIG. 6E). The results may include spoken points and/or quotes from other call participants that spoke before fifth participant joined the call.

The agenda functionality may have an intent to be executed at one or more execution moments during the call (e.g., after one quarter of the scheduled call time passes, during an interruption and/or a moment of silence, ten minutes before the call is scheduled to end, etc.). The moderator manager may execute the delayed intent associated with agenda functionality at halfway point during the meeting. The moderator manager may produce an audible signal to indicate that synthetic moderator is engaged. The moderator manager may create a delayed intent with execution moment set to the next audio silence and/or one or more participants may pronounce a keyword and/or a phrase that moderator manager may recognize as request to engage the agenda functionality.

The moderator manager may produce the results of executing delayed agenda functionality intent. Each connected call participants may be able to see and/or hear the current meeting agenda (632) on the client devices A (604) through E (612) (shown in FIG. 6F).

The third participant (using the client device E (612)) may request the agenda functionality to perform the updated intent (634) by speaking the agenda points that were covered since the last time agenda functionality intent was executed. The moderator manager may process the transcript of third participant's speech, extract the intent to mark some of the agenda points as completed, and execute the intent.

The moderator manager may execute an update to the agenda (636). The result of the execution of the intent (e.g., marking some agenda points as completed, crossing out agenda points, changing color of completed agenda point) may be produced and communicated to each of the connected meeting participants (shown in FIG. 6G).

Figure 6F:
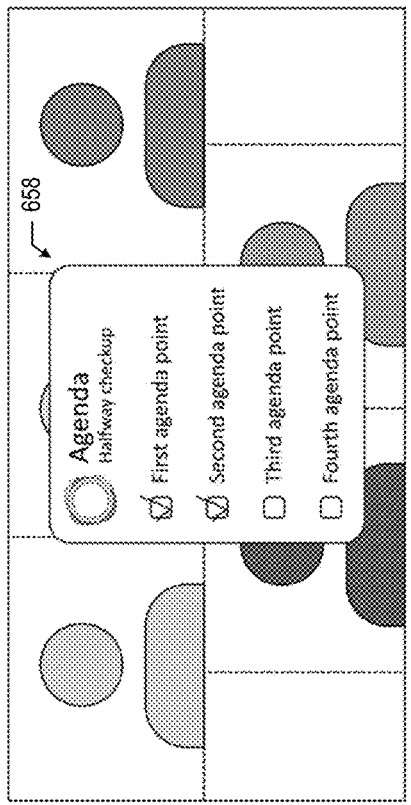
Figure 6G:
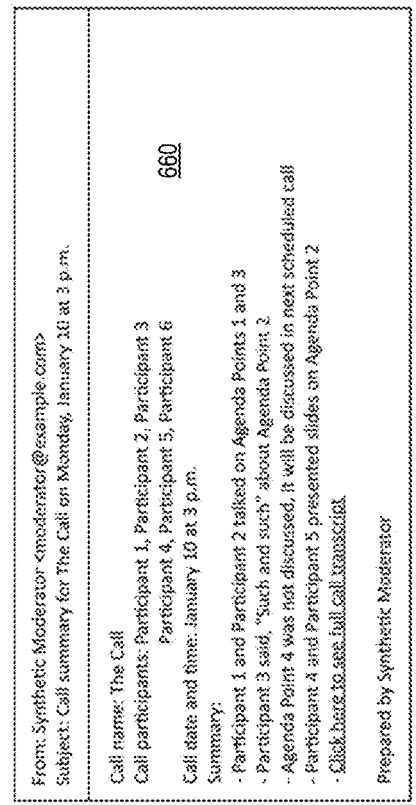
Figure 6H:
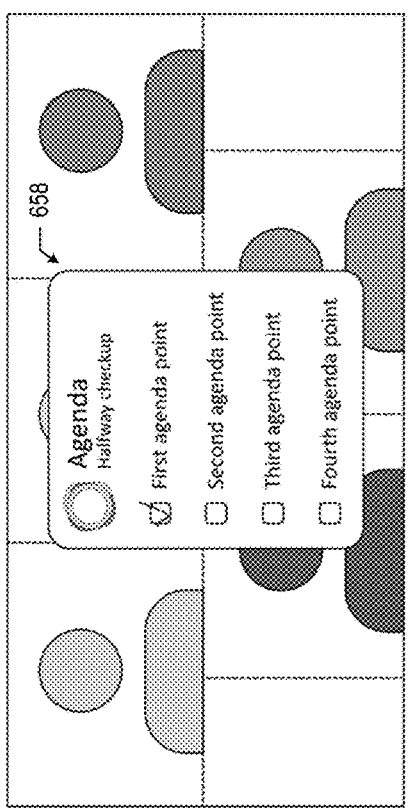

The moderator manager may continue transcribing and recording the transcription until the end of the call (shown in FIG. 6H). The moderator manager may then execute the summary functionality (638) as a delayed intent that is executed when the call ends (e.g., each of the participants have left). The execution result of that intent (e.g., brief transcript of the call) may be persistently stored and sent to each of the call participants via email, text notification, etc., by the moderator manager by invoking an API of the video conferencing service (shown in FIG. 6I).

Turning to FIG. 6B, the user interface (650) is displayed on the client device A (604) (of FIG. 6A). The user interface (650) shows four participants present on the call.

Turning to FIG. 6C, the user interface (650) is updated to show the icon (652). The icon (652) is a visual representation of the notification (624) of FIG. 6A.

Turning to FIG. 6D, the user interface (650) is updated to remove the icon (652) (of FIG. 6C). The call may proceed with multiple intents for the summary and agenda functionality.

Turning to FIG. 6E, the user interface (650) is updated to show the video stream (654) for the fifth participant. Additionally, the call join summary (656) is displayed. In one embodiment, the call join summary (656) may be shown on the client device E (612) without being displayed on the other client devices A (604) through D (610).

Turning to FIG. 6F, the user interface (650) is updated to display the agenda window (658). The agenda window (658) shows a list of pre-determined agenda items. One of the agenda items is marked as completed as a result of executing the update agenda intent.

Turning to FIG. 6G, the user interface (650) is updated to display an update to the agenda window (658). The agenda window (658) is updated to show an additional point has been discussed.

Turning to FIG. 6H, the user interface (650) is updated to remove the agenda window (658) (of FIG. 6G). The participants may continue the call.

Figure 6I:
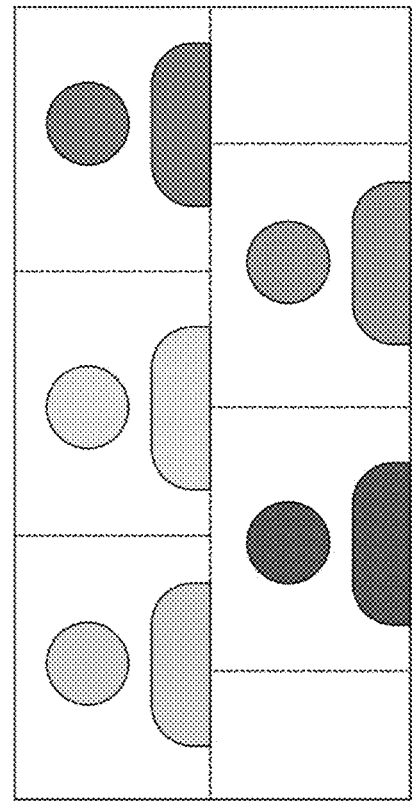

Turning to FIG. 6I, the user interface (650) is updated to display the summary (660). The summary (660) may be received by the client device A (604) (of FIG. 6A) after the call is ended and displayed after the video conferencing application is closed.

Figure 7A:
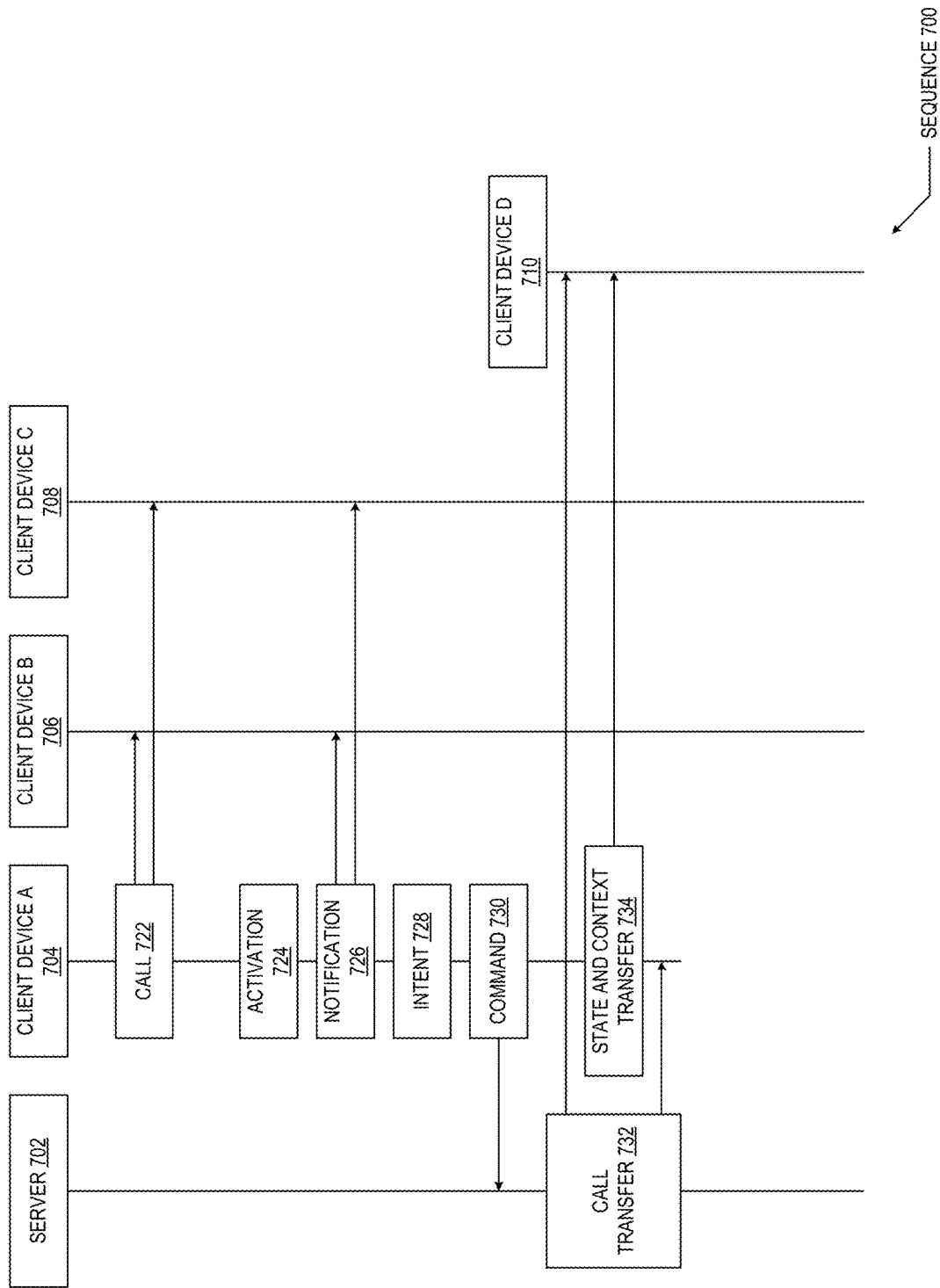

Turning to FIG. 7A, the sequence (700) performs a call transfer between devices using a synthetic moderator. The sequence (700) is performed by the server (702), the client device A (704), the client device B (706), the client device C (708), and the client device D (710).

Figure 7B:
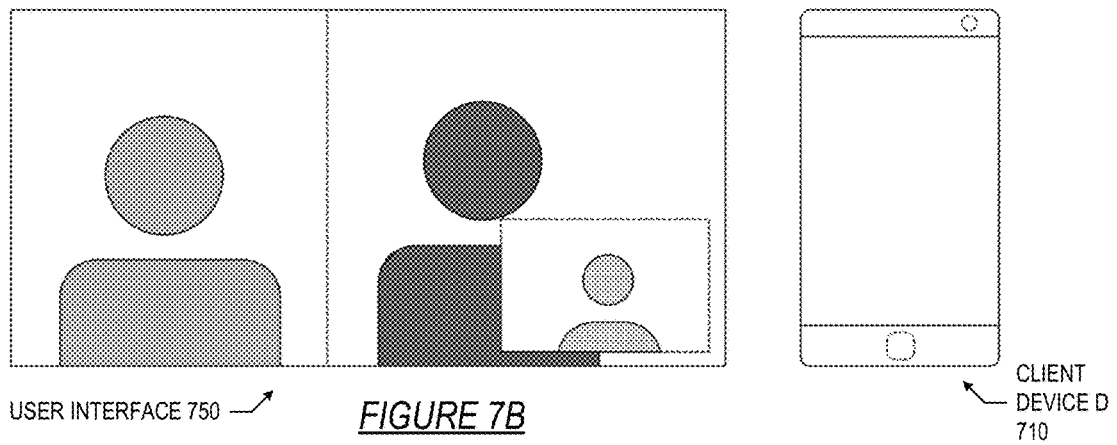

A first participant using the (client device A (704)) may be taking part in a scheduled video conference call (722) with two other participants (using the client devices B (706) and C 708) (shown in FIG. 7B). The client device A (704) may be a laptop computer that is used by the first participant to participate in the call. At some point during the call the first participant may decide to continue the call on the client device D (710), which may be a smartphone device.

The activation (724) is triggered by the first participant pronouncing a keyword phrase that may engage a synthetic moderator on the client device A (704). In some situations, the first participant may mute their microphone from other call participants before pronouncing a keyword phrase. The moderator manager may receive the notification message about synthetic moderator being engaged and moderator manager may activate transcription of audio from one or more call participants.

Figure 7C:
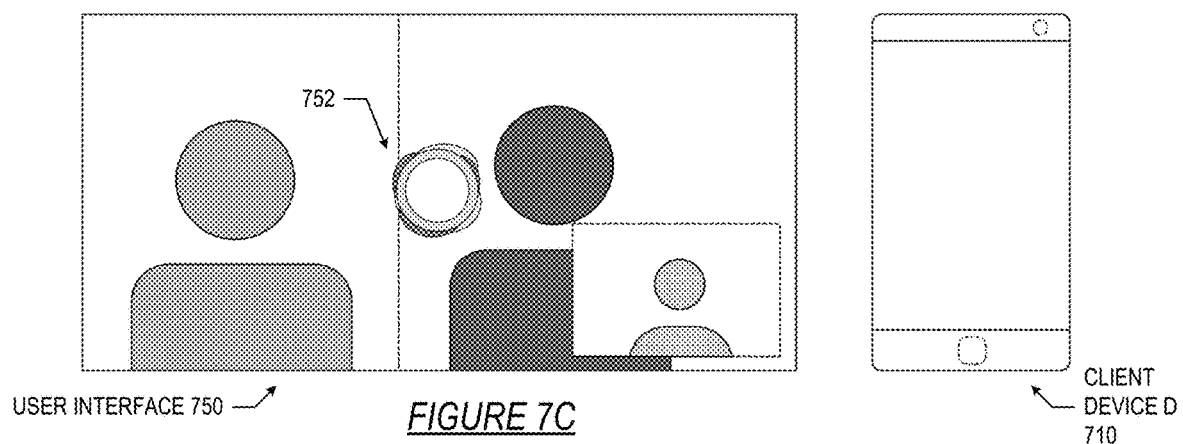

The moderator manager may produce the notification (726) as an audible and visual response with a greeting phrase (shown in FIG. 7C). One or more of the other call participants may be able to hear response and the notification (726).

The first participant may speak the phrase containing the intent (728) to transfer the call to another device (e.g., "transfer the call to my phone", "continue this call on my Android phone", "switch call to handheld", etc.), i.e., the client device D (710). The moderator manager may use the audio transcription from the first participant to extract the intent and context required for executing the intent.

The moderator manager may perform the command (730) by communicating with the video conferencing service hosted by the server (702) and transmit the device name extracted from the transcript (e.g., "phone", "Android phone", "handheld", etc.).

The server (702) may perform the call transfer (732) with the video conferencing service to initiate a connection with the identified device (the client device D (710)). The client device D (710) may join the video conference call before the current device (the client device A (704)) leaves the call.

As a part of the call transfer (732), the state and context transfer (734) may be performed for the moderator manager executing on the client device A (704) (or the moderator manager service executing on the server 702) to communicate with the moderator manager on the client device D (710). The moderator manager of the client device A (704) may transmit the state and context that has been gathered to the moderator manager of the client device D (710).

Figure 7D:
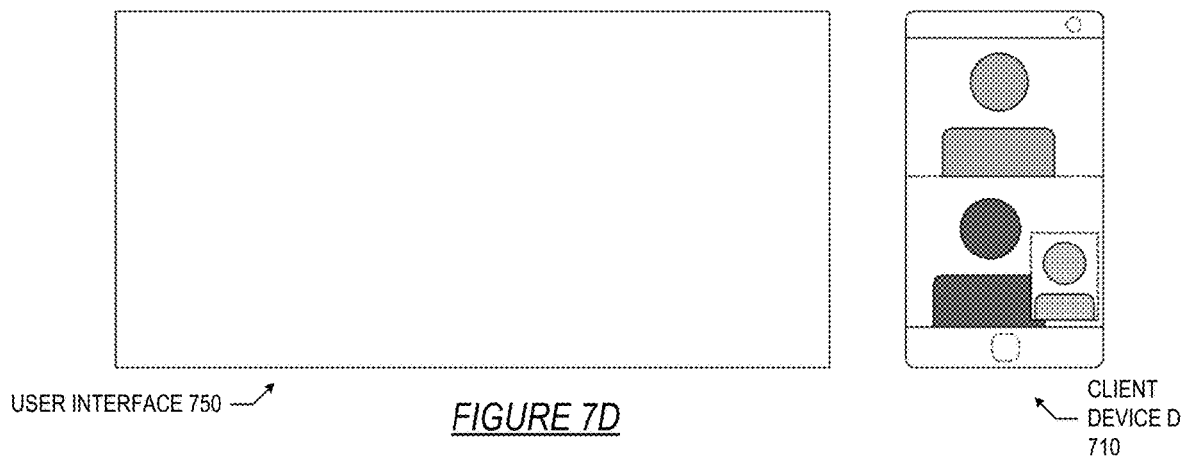

The client device A (704) may disconnect from the call (shown in FIG. 7D). The first participant may continue participating in the call using the client device D (710).

In one embodiment, the message below may be sent between moderator manager on the client device A (704) and moderator manager on the client device D (710).

```
{
  "state": {
    "key": "value" (zero or more, where "value" can be any serializable data type)
  },
  "context": {
    "key": "value" (zero or more, where "value" can be any serializable data type)
  }
}
```

In the message above, the state and context are transferred between moderator managers of the client devices A (704) and D (710) with the key and value strings for "state" and "context". The key and value strings for "state" identify the state of the current intent (the call transfer intent) and any pending intents on the client device A (704) (e.g., call scheduling intents, add participant intents, etc.). The key and value strings for "context" identify the context for the current and any pending intents on the client device A (704) (e.g., participant identifiers, dates, times, etc.).

Turning to FIG. 7B, the user interface (750) is displayed on the client device A (704) (of FIG. 7A). The user interface (750) shows three participants present on the call.

Turning to FIG. 7C, the user interface (750) is updated to show the icon (752). The icon (752) is a visual representation of the notification (726) of FIG. 7A.

Turning to FIG. 7D, the call has been transferred from the client device A (704) (operating the user interface (750)) to the client device D (710). The user interface (750) is updated to remove the video streams of the other participants. The client device D (710) is updated to show the video streams of the other participants of the call.

Embodiments of the invention may be implemented on a computing system. Any combination of a mobile, a desktop, a server, a router, a switch, an embedded device, or other types of hardware may be used. For example, as shown in FIG. 8A, the computing system (800) may include one or more computer processor(s) (802), non-persistent storage (804) (e.g., volatile memory, such as a random access memory (RAM), cache memory), persistent storage (806) (e.g., a hard disk, an optical drive such as a compact disk (CD) drive or a digital versatile disk (DVD) drive, a flash memory, etc.), a communication interface (812) (e.g., Bluetooth interface, infrared interface, network interface, optical interface, etc.), and numerous other elements and functionalities.

The computer processor(s) (802) may be an integrated circuit for processing instructions. For example, the computer processor(s) (802) may be one or more cores or micro-cores of a processor. The computing system (800) may also include one or more input device(s) (810), such as a touchscreen, a keyboard, a mouse, a microphone, a touchpad, an electronic pen, or any other type of input device.

The communication interface (812) may include an integrated circuit for connecting the computing system (800) to a network (not shown) (e.g., a local area network (LAN), a wide area network (WAN) such as the Internet, a mobile network, or any other type of network) and/or to another device, such as another computing device.

Further, the computing system (800) may include one or more output device(s) (808), such as a screen (e.g., a liquid crystal display (LCD), a plasma display, a touchscreen, a cathode ray tube (CRT) monitor, a projector, or other display device), a printer, an external storage, or any other output device. One or more of the output device(s) (808) may be the same or different from the input device(s) (810). The input and output device(s) (810 and (808)) may be locally or remotely connected to the computer processor(s) (802), non-persistent storage (804), and persistent storage (806). Many different types of computing systems exist, and the aforementioned input and output device(s) (810 and (808)) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (800) in FIG. 8A may be connected to or be part of a network. For example, as shown in FIG. 8B, the network (820) may include multiple nodes (e.g., node X (822), node Y (824)). Each node may correspond to a computing system, such as the computing system (800) shown in FIG. 8A, or a group of nodes combined may correspond to the computing system (800) shown in FIG. 8A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (800) may be located at a remote location and connected to the other elements over a network.

Figure 8B:
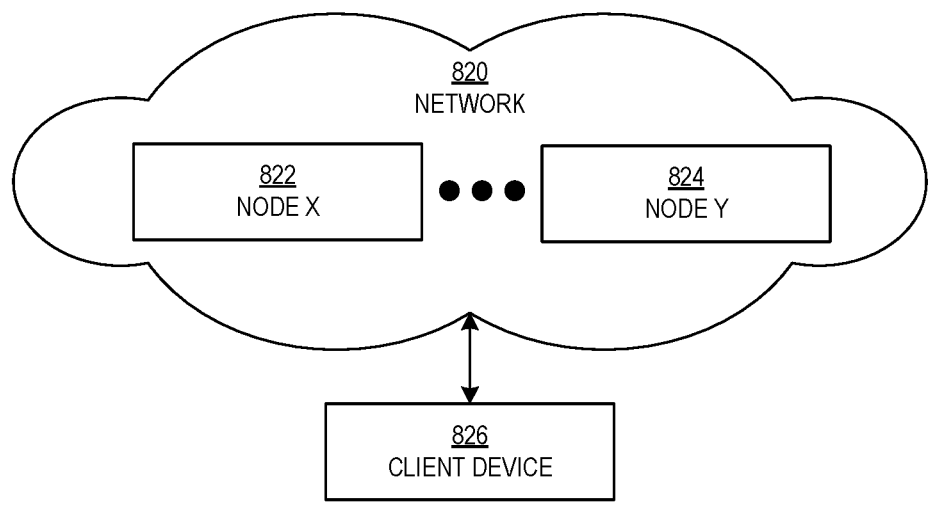

Although not shown in FIG. 8B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (822), node Y (824)) in the network (820) may be configured to provide services for a client device (826). For example, the nodes may be part of a cloud computing system. The nodes may include functionality to receive requests from the client device (826) and transmit responses to the client device (826). The client device (826) may be a computing system, such as the computing system (800) shown in FIG. 8A. Further, the client device (826) may include and/or perform all or a portion of one or more embodiments of the invention.

The computing system (800) or group of computing systems described in FIGS. 8A and 8B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data sharing techniques described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (800) in FIG. 8A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (800) of FIG. 8A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (800) in FIG. 8A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (800) of FIG. 8A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (800) of FIG. 8A and the nodes (e.g., node X (822), node Y (824)) and/or client device (826) in FIG. 8B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   obtaining utterance text from a conference call comprising a call context;
   identifying, from the utterance text, an intent for a command;
   identifying, from the call context, contextual data for the command;
   executing, by a moderator manager, the command using the contextual data to modify an agenda during the conference call; and
   presenting a result of executing the command, including visually highlighting agenda changes directly on shared video streams of the conference call and overlaying private join summaries to individual participants based on the contextual data; and
   executing a second command to transfer a call from a third client device of a first participant to a fourth client device of the first participant, wherein transferring the call comprises:
      sending a message to the fourth client device, wherein the message comprises a state key string, a state value string, a context key string, and a context value string, wherein the state key string and state value string identify the intent and a pending intent of the third client device, wherein the context key string and context value string identify the contextual data and pending contextual data.

2. The method of claim 1, further comprising:
   identifying the intent by the moderator manager; and
   modifying the agenda by the moderator manager during the conference call based on a transcript.

3. The method of claim 1, further comprising:
   obtaining the utterance text by one of:
      transcribing speech from an audio stream of the conference call to form the utterance text; and
      receiving the utterance text as user input from a participant of the conference call.

4. The method of claim 1, further comprising:
   transcribing speech from a second audio stream of the conference call to form a second utterance text.

5. The method of claim 1, further comprising:
   executing the command after a delay.

6. The method of claim 1, further comprising:
   transcribing subsequent speech from an audio stream to form subsequent text; and
   identifying non-contextual data for the command from the subsequent text.

7. The method of claim 1, further comprising:
   receiving subsequent speech from a second audio stream of the conference call corresponding to a second participant.

8. The method of claim 1, further comprising:
   identifying the intent by:
      sending the utterance text as an input to a chatbot; and
      receiving the intent as an output from the chatbot, wherein the output is a text string; and mapping the output from the chatbot to the command.

9. The method of claim 1, further comprising:
executing the command to add a subsequent participant to the conference call using a subsequent participant identifier from non-contextual data.

10. The method of claim 1, further comprising:
executing the command to schedule an ensuing conference call using the contextual data and non-contextual data.

11. The method of claim 1, further comprising:
executing the command to unmute an audio stream of the conference call.

12. The method of claim 1, wherein the call context comprises a call identifier, a set of participant identifiers corresponding to a set of participants of the conference call, a mute status of a participant of the set of participants.

13. The method of claim 1, wherein the intent is one of a set of intents and the intent comprises a name, a set of trigger strings, and a set of commands comprising the command.

14. The method of claim 1, wherein the command comprises a function call to an application programming interface (API).

15. The method of claim 1, wherein the contextual data comprises one or more of a call identifier, a set of participant identifiers, and a mute status of a participant.

16. The method of claim 1, wherein non-contextual data for the command comprises one or more of a subsequent participant identifier, a date value, and a time value.

17. A system comprising:
at least one processor;
an application executing on the at least one processor and configured for:
obtaining utterance text from a conference call comprising a call context;
identifying, from the utterance text, an intent for a command;
identifying, from the call context, contextual data for the command;
executing, by a moderator manager, the command using the contextual data to modify an agenda during the conference call; and
presenting a result of executing the command, including visually highlighting agenda changes directly on shared video streams of the conference call and overlaying private join summaries to individual participants based on the contextual data; and
executing a second command to transfer a call from a third client device of a first participant to a fourth client device of the first participant, wherein transferring the call comprises:
sending a message to the fourth client device, wherein the message comprises a state key string, a state value string, a context key string, and a context value string, wherein the state key string and state value string identify the intent and a pending intent of the third client device, wherein the context key string and context value string identify the contextual data and pending contextual data.

18. The system of claim 17, wherein the application is further configured for:
identifying the intent by the moderator manager; and
modifying the agenda by the moderator manager during the conference call based on a transcript.

19. A method comprising:
connecting, by a client device, to a conference call comprising a call context;
obtaining utterance text from the conference call;
identifying, from the utterance text, an intent for a command;
identifying, from the call context, contextual data for the command;
executing, by a moderator manager, the command using the contextual data to modify an agenda during the conference call; and
presenting a result of executing the command, including visually highlighting agenda changes directly on shared video streams of the conference call and overlaying private join summaries to individual participants based on the contextual data; and
executing a second command to transfer a call from a third client device of a first participant to a fourth client device of the first participant, wherein transferring the call comprises:
sending a message to the fourth client device, wherein the message comprises a state key string, a state value string, a context key string, and a context value string, wherein the state key string and state value string identify the intent and a pending intent of the third client device, wherein the context key string and context value string identify the contextual data and pending contextual data.

* * * * *